United States Patent [19]

Dorman et al.

[11] Patent Number: 4,517,111

[45] Date of Patent: May 14, 1985

[54] ABSORBENTS FOR AIRBORNE FORMALDEHYDE

[75] Inventors: Linneaus C. Dorman; Vernon A. Stenger, both of Midland, Mich.

[73] Assignee: The Dow Chemical Company, Midland, Mich.

[21] Appl. No.: 571,039

[22] Filed: Jan. 16, 1984

[51] Int. Cl.$^3$ ............................................... C09K 3/00
[52] U.S. Cl. ............................ 252/186.25; 252/408.1
[58] Field of Search .......................... 423/245; 55/74; 502/324; 252/408.1, 186.25

[56] References Cited

U.S. PATENT DOCUMENTS

| | | | |
|---|---|---|---|
| 1,995,274 | 3/1935 | Eversole | 502/324 |
| 2,025,140 | 12/1935 | Wenzel | 502/324 |
| 3,049,399 | 12/1958 | Gamson et al. | |
| 3,118,747 | 1/1964 | Codignola et al. | 55/74 |
| 3,201,917 | 8/1965 | Wood | 55/74 |
| 3,226,332 | 12/1965 | Lincoln et al. | |
| 4,159,970 | 7/1979 | Heckelsberg | 502/324 |
| 4,443,354 | 4/1984 | Eian | |

FOREIGN PATENT DOCUMENTS

| | | | |
|---|---|---|---|
| 18552 | 5/1974 | Japan | 502/324 |
| 7215679 | 5/1973 | Netherlands | 502/324 |

*Primary Examiner*—Ben R. Padgett
*Assistant Examiner*—T. J. Wallen
*Attorney, Agent, or Firm*—Donald L. Corneglio

[57] ABSTRACT

A composition of matter comprising a permanganate salt adsorbed or chemisorbed onto a solid alkaline support useful in a method for irreversibly removing or decreasing the amount of formaldehyde in the atmosphere. The composition further provides a color change indication when the formaldehyde absorbing characteristic is exhausted. The composition can be employed in molded, pellet, particle or powder form as, for example, in a respirator filter cartridge.

16 Claims, No Drawings

ABSORBENTS FOR AIRBORNE FORMALDEHYDE

BACKGROUND OF THE INVENTION

This invention generally relates to a composition of matter effective in reacting with airborne or gaseous formaldehyde. Further, the invention provides for a method which irreversibly removes or decreases the amount of formaldehyde from the environment and visually indicates when the formaldehyde removing characteristic is exhausted.

The presence of formaldehyde in the air has long been known to cause discomfort and to be a potential health hazard over prolonged contact. Sources of formaldehyde, especially in the home environment, are numerous. In particular, airborne formaldehyde can be traced to manufacturing processes, particle board, polywood, insulation foam, carpeting, drapes and paneling. While the exact tolerance levels of formaldehyde exposure are vague, it is generally recognized that continuous exposure to even very low levels of formaldehyde can be a source of discomfort even without pronounced irritation. Irritation to the eyes and nasal passages is, however, noticeable at the 0.5 to 1.0 ppm range.

Means by which to remove or lower the levels of airborne formaldehyde have therefore been sought. Attempts to reduce formaldehyde levels have been tried at both the manufacturing stage of potential formaldehyde releasing articles and in the ambient where these articles are installed. For example, U.S. Pat. No. 4,397,756 provides for a method and composition for the reduction of formaldehyde emission in wood panels. This composition comprises urea, a carbohydrate based material and an acidic catalyst. U.S. Pat. No. 4,346,181 attempts to reduce formaldehyde emission from urea formaldehyde foams by incorporating a polymer of acrylamide and/or methacrylamide. U.S. Pat. No. 4,331,438 is directed toward reducing formaldehyde in textile materials by generally treating the material with mixtures of urea and an inert liquid carrier.

While increased measures have been taken to reduce exposure to formaldehyde, there is a continuing need to improve methods for controlling small concentrations of gaseous formaldehyde in the environment. It, therefore, would be desirable to develop a filter-type means whereby the formaldehyde would be irreversibly retained and where the filter upon saturation would give some indication that it should be replaced.

SUMMARY OF THE INVENTION

The present invention provides for a composition of matter comprising a solid alkaline support portion and a permanganate salt absorbed or chemisorbed onto its surface. The permanganate salt is present from about 0.1 to about 10 percent per total weight of solid alkaline support. The composition can be present in a molded, pellet, particle or fine powder form.

The present invention further provides for a method of removing or decreasing the amount of formaldehyde present in an atmosphere by exposing to that atmosphere a composition formed from a solid alkaline support portion and a permanganate salt portion in an amount of from about 0.1 to about 10.0 percent (per total weight of the solid alkaline support) adsorbed or chemisorbed onto the surface of the solid alkaline support. This composition can be loose or contained in a container or cartridge means whereby the formaldehyde contaminated atmosphere can be contacted. Further, the composition can be contained or positioned such that a color change can be observed which would indicate when the formaldehyde absorbing characteristic of the composition is exhausted.

The present invention still further provides for an effective and irreversible method of removing or decreasing the amount of gaseous or airborne formaldehyde in the atmosphere. The composition of matter provides a color indication when the composition must be replaced and, therefore, is particularly applicable for use in replaceable or refillable cartridges for respirator filter cartridges where the threat of formaldehyde inhalation is present. More generally, the color indication is useful in determining when the composition should be replaced regardless of the form of use.

DETAILED DESCRIPTION OF THE INVENTION

Generally the subject invention comprises a composition formed from a permanganate salt adsorbed or chemisorbed on the surface of an alkaline support medium.

What is meant by adsorbed is that the permanganate salt is adhered to the surface of the support by physical adsorption. Chemisorbed would be by the formation of bonds between the surface molecules of the support compound and the permanganate salt usually on an order much stronger than the van der Waals type bond which characterizes physical adsorption. Preferably, the support medium is light in color in order to facilitate an easily identifiable color change indicator as described herein. One example of the invention would be potassium permanganate adsorbed on magnesium hydroxide.

As indicated below, the subject composition irreversibly removes or diminishes the amount of gaseous formaldehyde in the environment. The gaseous formaldehyde is first oxidized by the permanganate salt into a nonvolatile formate and subsequently into a harmless carbonate by the alkaline support medium. During the process of these reactions the composition gradually turns from purple to brown as the permanganate salt reduces to manganese dioxide. Thus, a visible indicator is provided to warn when the composition needs to be replaced.

The chemistry of this invention may be generally outlined into three basic reactions as follows:

Reaction One $$3HCO + 2MnO_4^- + OH^- \rightarrow 3HCO_2^- + 2MnO_2 + 2H_2O$$

Reaction Two $$3HCO_2^- + 2MnO_4^- + OH^- \rightarrow 3CO_3^{-2} + 2MnO_2 + 2H_2O$$

Reaction Three $$CO_3^{-2} + Mg^{+2} \rightarrow MgCO_3$$

In addition to the benefit of providing a nonreversible mechanism for removing formaldehyde the subject composition can also react with polymeric forms of formaldehyde such as paraformaldehyde and other acidic or oxidizable noxious pollutants in the environment, such as sulfur dioxide, hydrogen sulfide and nitrogen dioxide, to render them innocuous.

The subject composition can be prepared by techniques generally known in the art for adsorbing or chemisorbing salts on a support medium. More particularly, the salt can be dispersed in an aqueous solution to which is added the support component. After mixing, the water is evaporated, thereby depositing the salt onto the support component. The resulting composition can then be formed into any convenient shape such as by molding or breaking into granule, particle or fine powder form. The amount of permanganate salt employed is generally from about 0.1 to about 10 weight percent of the total support component weight. Preferably, the permanganate salt is present at from about 1 to about 5 weight percent of the total support component and the more preferred weight percent of permanganate salt is 2 percent.

The permanganate salt portion of the composition is generally composed of a metal element from the IA or IIA group of the Periodic Table and a sufficient amount of permanganate anion to satisfy the valence requirement. Preferably, the metal ions comprise $Li^+$, $Na^+$, $K^+$, $CS^+$, $Mg^{2+}$, $Ca^{2+}$, $Sr^{2+}$ and $Ba^{2+}$. The more preferred ions are $Na^+$ and $K^+$.

The solid alkaline support component of the subject composition can comprise alkaline solids capable of having a permanganate salt absorbed thereupon. The preferred supports are solids with high surface areas which are light in color. High surface area is desirable to aid in the adsorption of the permanganate salt. Finely divided or microporous materials presenting a large area of active surface are strong adsorbents and are therefore preferred. The light color consideration is in order to aid in the distinquishment of the permanganate color change to identify when the composition needs to be replaced. Where this color change feature is not desired or practical no preference to light colored alkaline supports need be made.

The preferred solid alkaline supports comprise magnesium hydroxide, calcium hydroxide, and the mixed hydroxides of calcium and magnesium obtained by hydrating calcined dolomite. Other hydroxides such as those of barium or strontium may be suitable supports from the standpoint of permitting the reaction, but have disadvantages because of solubility, toxicity or added expense. Precipitated or finely ground calcium carbonate is satisfactory. More inert but powdery materials such as bentonite, talc, montmorillonite and other clays or clay-like silicates may be used if the surfaces are rendered alkaline, such as by pretreatment with an alkali (carbonates or hydroxides of sodium or potassium) or by addition of such alkali to the permanganate solution before mixing with the support. The most preferred support in terms of a favorable weight ratio of permanganate to support, as well as other favorable properties, is magnesium hydroxide.

EXAMPLE 1

Composition Preparation

To a portion of magnesium hydroxide powder was added an amount of potassium permanganate equal to approximately 2 weight percent $KMnO_4$ (dry-basis) of the magnesium hydroxide used. After thoroughly mixing, the composite was dried in air free of readily oxidizable organic or inorganic matter. The resulting pink mass was then broken gently into convenient sized particles. Further, compositions were prepared as described above with lumps or slurries of magnesium hydroxide instead of magnesium hydroxide powder.

EXAMPLE 2

Formaldehyde Absorbance

Sections of Pyrex® glass tubing, 10 mm diameter and ca 12 cm long, were tapered and sealed at one end. A small plug of glass wool was inserted in the neck of the tubes at the sealed end.

Tubes were charged with 1-g portions of $KMnO_4/Mg(OH)_2$, as prepared in Example 1, topped with another small wad of glass wool, then capped with plastic caps until ready for testing. To test the effectiveness of the absorbent materials to remove airborne formaldehyde, the tubes were attached at the top end to a manifold via plastic connectors using O-rings, and at the bottom, after cutting off the glass tips, by gum rubber tubing (approximately 30 cm long) which were in turn attached to glass impinger cells each containing 15 ml of purified water (deionized water put through Millipore® filtration system consisting of ion exchange and activated charcoal absorbers). The impingers were connected to precalibrated suction valves set to draw 50 ml/min of air through each absorbent tube (neglecting resistance to flow). With tubes in place, including two blank tubes containing only a small plug of glass wool, the system was equilibrated for 10 minutes with formaldehyde-free air, then switched to a gaseous formaldehyde source that was fed into the manifold. The gaseous formaldehyde was generated from permeation tubes containing paraformaldehyde at 100° C. using a Dynacalibrator (Vici Metronics) instrument. The generation rate was 8.6 mcg/minute and formaldehyde was carried in an air flow at 1.23 l/minute to the manifold producing an atmosphere of 5.66 ppm of formaldehyde. Flow through the absorption tubes was continued for 4 hours. The impinger cells were detached and their solutions were carefully removed. Each cell was rinsed twice with about 1.5 ml of water and the rinses were combined with their respective solutions which were then capped in vials and refrigerated until they were analyzed for formaldehyde content by polarography. The results are summarized in Table I below.

TABLE I

| Example | Absorbent | Impinger Solution Formaldehyde Content (mcg)[1] |
|---|---|---|
| A* | Blank Tube I | 93.61 |
| B* | Blank Tube II | 90.61 |
| C* | $Mg(OH)_2$ | 12.61 |
| D | $KMnO_4/Mg(OH)_2$ | 0.28 |

*Not an example of this invention.
[1]Total formaldehyde found (corrected by a polarographic reagent blank using normal procedure for determining aldehydes by differential pulse polarography).

Relative to the blank tubes, Examples A and B, the data indicate that the subject invention, D, effectively absorbed the gaseous formaldehyde. Example D, $KMnO_4/Mg(OH)_2$, tube bed showed a color gradient going from white, sprinkled with pink specks, at the top of the bed (formaldehyde entry point) to a solid pink color at the bottom of the bed. This indicates that all the subject composition's absorbance capacity had not yet been exhausted. Further, the data indicate that the mere presence of the alkaline base, Example C, $Mg(OH)_2$, alone, was not as effective in removing the proportion of gaseous formaldehyde as Example D. Therefore, the combined result of $KMnO_4$ absorbed on a $Mg(OH)_2$ support gave superior formaldehyde absorbance.

EXAMPLE 3

Formaldehyde Absorbance

Five-gallon, wide-mouthed, glass jars were equipped with a Teflon-coated, ovalshaped, magnetic stirring bar and screw caps, each supporting a 25 mm piece of Teflon tube (ca 2 mm diameter) held snugly in place with epoxy resin. The Teflon tube extended 13 mm into the jars. To assure that all the amine hardener in the epoxy resin was exhausted, the caps were placed over a beaker of formalin solution for a day then left standing in a fume hood for another day before using. Glass rod, ~2 mm, was fit snugly into the Teflon tubing to provide a seal. The jars were supported on an aluminum platform supported on cardboard atop magnetic stirrers. Air was circulated below the platform to cool the magnetic stirrers. Temperatures in the jars ranged from 26° C.-27.5° C. Formaldehyde content (ppm) in the jars was determined with the aid of a Lion Formaldemeter (Lion Laboratories, Ltd., Pearl Street, Cardiff, United Kingdom). The Formaldemeter's gas intake sampling tube also fits snugly into the Teflon tube opening to the test jars thereby premitting formaldehyde determination in the jar's vapor.

To a test jar and a control jar were added, respectively, 107 mg and 99 mg of 20 percent (wt/wt) ultrapore, methanol-free, formaldehyde solution in small vials lowered to the bottom of the jars with long forceps. The caps were set in place and formaldehyde vapors were allowed to equilibrate with solid paraformaldehyde (deposited on evaporation of the water) in the jars. After 22 hours, the formaldehyde vapor concentration in both jars was ca 82.1 ppm (the Formaldemeter is most accurate at 0.3-10.0 ppm levels of formaldehyde). Six grams of 2 percent $KMnO_4/Mg(OH)_2$ in a 3-inch glass dish were lowered quickly into the test jar via a metal cradle and string so as to minimize displacement of air from the jar. The cap was replaced promptly. Within a minute, visual evidence of reduction of $KMnO_4$ by formaldehyde was apparent as the edges of the absorbent changed from purple to brown. Loss of formaldehyde gas in the chambers was followed with the Formaldemeter as is indicated below in Table II. (—, indicates no measurement taken.)

TABLE II

| Removal of Formaldehyde With Time | | |
| --- | --- | --- |
| Post $KMnO_4/Mg(OH)_2$ | Formaldehyde Gas (ppm) | |
| Time (Hr) | Test Jar | Control Jar |
| 4.25 | — | 82 |
| 4.67 | 19 | — |
| 8.00 | 23 | — |
| 8.75 | — | 82 |
| 46.00 | 12 | — |
| 52.50 | — | 82 |
| 73.30 | 2.7 | — |
| 76.50 | — | 82 |
| 141.00 | — | 68 |
| 141.80 | 0.9 | — |

EXAMPLE 4

The absorption of formaldehyde was measured, as described in Example 3, using 4.5 g of magnesium hydroxide alone, and 82.6 mg and 86.1 mg of the 20 percent formaldehyde solution in the test and control jars respectively. After 17 hours, the vapor concentrations of formaldehyde in the test and control jars were 68 and 64 ppm, respectively; jar temperatures were 27.5° C. and 26° C., respectively; and the magnesium hydroxide was added to the test jar. Loss of gaseous formaldehyde in the chambers was followed with the Formaldemeter (the Formaldemeter is most accurate at 0.3-10.0 ppm levels of formaldehyde) as is indicated below in Table III. (—, indicates no measurement was taken.) No visual evidence of formaldehyde absorption was discernable.

TABLE III

| Removal of Formaldehyde with Time | | |
| --- | --- | --- |
| Post $Mg(OH)_2$ | Formaldehyde Gas (ppm) | |
| Time (Hr.) | Test Bottle | Control Jar |
| 4.0 | — | 69 |
| 6.0 | 54 | — |
| 24.0 | 39 | — |
| 26.0 | — | 82 |
| 70.0 | 45 | — |
| 71.0 | — | 82 |
| 78.5 | 43 | — |
| 118.0 | — | 82 |
| 119.5 | 26 | — |

The $Mg(OH)_2$ functions as a slow absorber of formaldehyde, most probably due to a Cannizzaro type reaction. The data indicate that although gaseous formaldehyde is partially removed by $Mg(OH)_2$, alone, it is much more thoroughly removed by the $KMnO_4/Mg(OH)_2$ as indicated in Table II. For example, after 70.0 hours the data from Table III shows 45 ppm of formaldehyde gas over the $Mg(OH)_2$ while Table II shows only 2.7 ppm of formaldehyde gas over the $KMnO_4/Mg(OH)_2$. Further, Table III shows a fall in formaldehyde ppm at 24 hours, a rise at 70 hours and a fall at 78 hours.

The subject invention as described can be employed to remove airborne formaldehyde or lower its concentration to a safer level. This can be accomplished by placing granules, pellets or other molded or suitable forms of the subject composition where it can contact the air. More effectively, the composition is placed in an area of continual air flow such as filters, air ducts, or near a heating system's intake or exhaust where the air flow would be concentrated. The composition can be dispersed loosely, as in trays, or contained in a permeable container means.

In addition to removing formaldehyde from the ambient air of dwellings or work places, the composition can also be advantageously used in respirators. Use in respirators can be employed where a person is exposed to atmospheres having potential for gaseous formaldehyde and to thereby reduce the inhalation of formaldehyde. Preferably, the composition would be placed in a transparent container or cartridge, or by other means rendered observable such that a color change in the composition could be seen to indicate that the absorption capacity has been exhausted and that the composition or cartridge means should be replaced.

The subject composition can also be admixed with other materials not deleterious to its formaldehyde absorption characteristic in order to incorporate it into existing systems where the reduction of formaldehyde would be desirable.

It is believed that other means for employing the subject composition can be determined by those skilled in the art without departing from the spirit of the invention herein disclosed and described.

What is claimed is:

1. A composition of matter comprising a solid alkaline support portion, and a permanganate salt portion in an amount of from about 0.1 to about 10.0 percent per total weight of said solid alkaline support adsorbed or chemisorbed onto the surface of said solid alkaline support.

2. The composition of claim 1 wherein said solid alkaline support portion is magnesium hydroxide, calcium hydroxide, or a mixture thereof, or a clay-like material with the surface rendered alkaline by treatment with an alkaline solution.

3. The solid alkaline support of claim 2 which is magnesium hydroxide.

4. The composition of claim 1 wherein said permanganate salt portion comprises a permanganate anion and a metal ion selected from Group IA or IIA of the Periodic Table.

5. The permanganate salt of claim 4 wherein said metal ion is potassium.

6. The composition of claim 1 wherein the amount of said permanganate salt portion is from about 1 to about 5 weight percent of said total solid alkaline support portion.

7. The composition of claim 1 which is present in molded, pellet, granule, particle or powder form.

8. A method for decreasing the amount of formaldehyde present in an atmosphere comprising:

exposing to said atmosphere a composition formed from a solid alkaline support portion, and a permanganate salt portion in an amount of from about 0.1 to about 10.0 percent per total weight of said solid alkaline support adsorbed or chemisorbed onto the surface of said solid alkaline support.

9. The method of claim 8 wherein said composition can be observed for a color change to indicate when the formaldehyde absorbing characteristic of said composition is exhausted.

10. The method of claim 8 wherein said composition is contained in a container or cartridge means whereby an atmosphere containing gaseous formaldehyde is contacted with said composition.

11. The method of claim 10 wherein said composition can be observed for a color change to indicate when the formaldehyde absorbing characteristic of said composition is exhausted.

12. The method of claim 8 wherein said composition is present in molded, pellet, particle or powder form.

13. The solid alkaline support of claim 12 which is magnesium hydroxide.

14. The method of claim 8 wherein said solid alkaline support portion is magnesium hydroxide, calcium hydroxide, or a mixture thereof, or a clay-like material with the surface rendered alkaline by treatment with an alkaline solution.

15. The method of claim 8 wherein said permanganate salt portion comprises a permanganate anion and a metal ion selected from Group IA or IIA of the Periodic Table.

16. The method of claim 8 wherein said metal element is potassium.

* * * * *